(12) United States Patent
Robertson

(10) Patent No.: US 7,451,691 B2
(45) Date of Patent: Nov. 18, 2008

(54) NO WASTE COOKING OVEN WITH MULTIPLE COOKING FUNCTIONS

(76) Inventor: Michael L. Robertson, 5531 NE. 31st Ave., Ft. Lauderdale, FL (US) 33308

( * ) Notice: Subject to any disclaimer, the term of this patent is extended or adjusted under 35 U.S.C. 154(b) by 601 days.

(21) Appl. No.: 10/802,599

(22) Filed: Mar. 16, 2004

(65) Prior Publication Data
US 2005/0204934 A1 Sep. 22, 2005

(51) Int. Cl.
*A23L 1/00* (2006.01)
(52) U.S. Cl. .............. 99/330; 99/331; 99/446; 99/468; 99/482; 219/401
(58) Field of Classification Search .......... 99/352–355, 99/467–482, 483, 516, 536; 219/400, 401
See application file for complete search history.

(56) References Cited

U.S. PATENT DOCUMENTS

| | | | |
|---|---|---|---|
| 2,060,992 A | 11/1936 | Jackson | |
| 4,300,523 A | 11/1981 | Robertson et al. | |
| 4,344,358 A | 8/1982 | Maurer | |
| 4,474,107 A | 10/1984 | Cothran | |
| 4,510,854 A | 4/1985 | Robertson | |
| 4,574,689 A | 3/1986 | Robertson | |
| 4,669,447 A | 6/1987 | Kelly | |
| 5,261,424 A * | 11/1993 | Sprinkel, Jr. | 131/329 |
| 5,501,142 A | 3/1996 | Bailey | |
| 5,552,578 A | 9/1996 | Violi | |
| 6,012,381 A | 1/2000 | Hawn | |
| 6,041,695 A | 3/2000 | Kuopus | |
| 6,121,583 A * | 9/2000 | Hansen | 219/401 |
| 6,138,553 A | 10/2000 | Toebben | |
| 6,152,024 A * | 11/2000 | Tippmann | 99/472 |
| 6,188,045 B1 | 2/2001 | Hansen et al. | |
| 6,564,699 B1 * | 5/2003 | Vincente et al. | 99/468 |
| 6,608,288 B2 * | 8/2003 | Maahs | 219/391 |
| RE39,365 E | 10/2006 | Zaydman | |
| 7,157,668 B2 * | 1/2007 | Bartelick | 219/393 |

OTHER PUBLICATIONS

International Preliminary Report on Patentability, PCT/US2005/007943, undated.
International Search Report and the Written Opinion of the International Searching Authority, or the Declaration, undated.
*Introducing The Best Thing to Happen To Ribs Since Eve*. The One-Step Dinner House Rib Smoker. Oct. 1999.
*Dinner House Rib Smoker Oven*. Southern Pride Distributing, L.L.C. Oct. 1999.

* cited by examiner

*Primary Examiner*—Timothy F. Simone
(74) *Attorney, Agent, or Firm*—Polster Lieder Woodruff & Lucchesi LC

(57) ABSTRACT

A multifunctional cooking oven for the preparation of food products including a cooking chamber, racks within the cooking chamber to support products to be prepared in the oven and a primary convection heat source. There is a drainable collection pan positioned below the racks to collect by-products rendered from the food products during preparation for later use. A steam source is positioned below the collection pan as well as a flavored smoke generator at the bottom of the preparation chamber. Airflow paths within the preparation chamber allow for the circulation of heat, steam and flavored smoke around the racks. The oven includes a programmable controller to control the primary heat source, the steam source and the flavored smoke generator that is programmed to operate any one of the heat source, the steam source and the flavor generator in any predetermined sequence, and for any predetermined duration of time to provide optimum preparation and flavoring of the products.

17 Claims, 10 Drawing Sheets

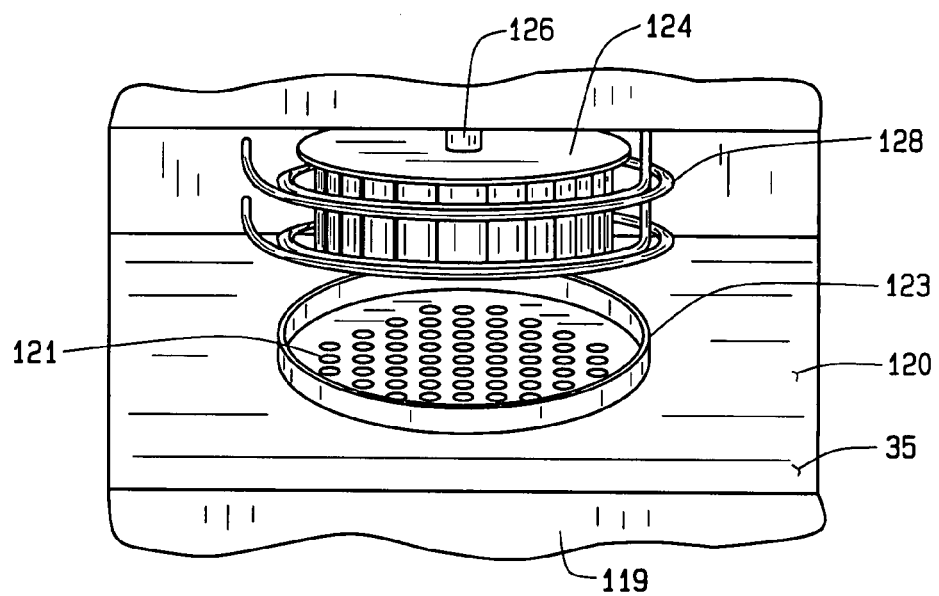
FIG. 10
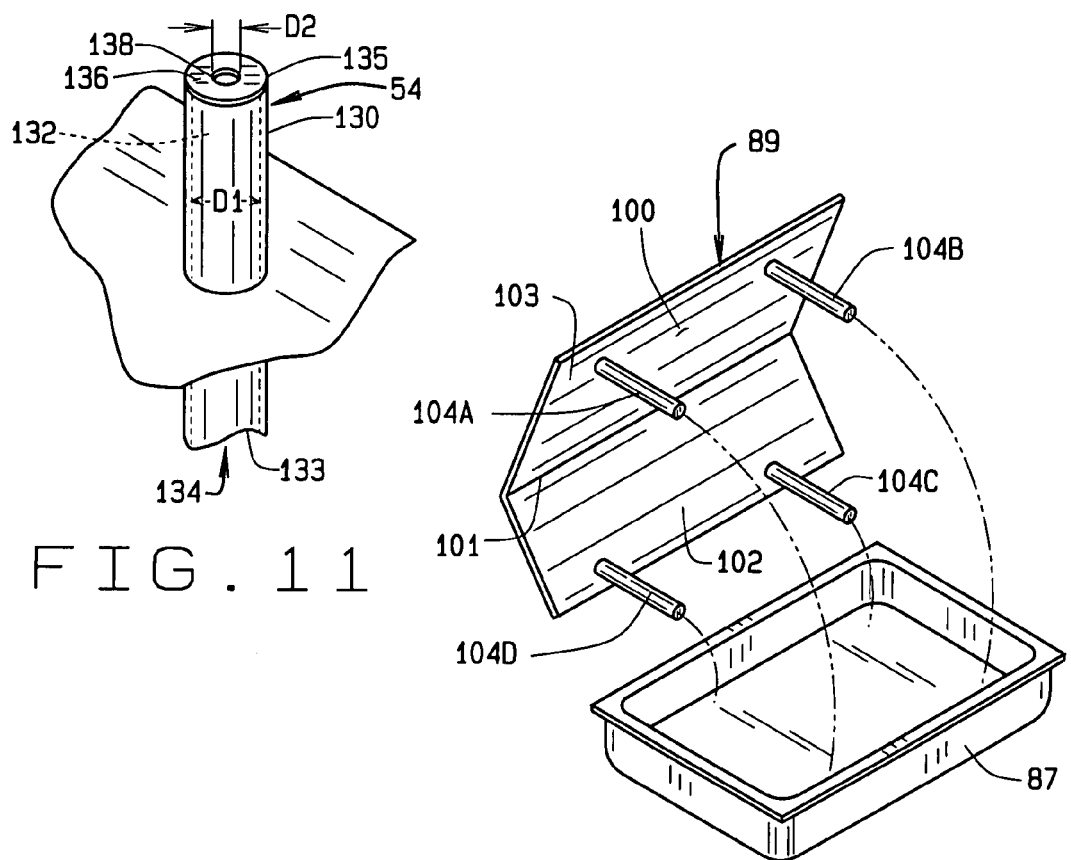
FIG. 11
FIG. 12

NO WASTE COOKING OVEN WITH MULTIPLE COOKING FUNCTIONS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The invention relates generally to ovens for preparing food products, and more particularly to an oven that cooks by heat or steam or smoke or any combination thereof, with substantially no wasted by-products.

Food products, for example meats such as beef, pork, and poultry, as well as fish and the like, traditionally are prepared for consumption by subjecting the raw product to sufficient heat so as to cook the product to an appropriate level of doneness. Various ovens or cookers are used for roasting, broiling, smoking or barbequing meat. In most instances, the cookers or ovens used to prepare the product have a cooking chamber and a source of convection heat, for example, electric heating elements, gas jets, wood or charcoal burners. In commercial food preparation, for example in restaurants, large ovens are employed to cook or prepare large quantities of product at one time. For example, large convection ovens or barbeque ovens or smokers are used to prepare batches of food products, such as roasts, ribs, chickens, fish and sometimes potatoes and other vegetables. These products generally are placed on racks inside the cooking chamber and subjected to heat and/or smoke It is recognized that when products, such as meat, are prepared in conventional ovens, often there are substantial amounts of wasted by-products. For example, because the conventional ovens generally cook with dry heat and because the meats are placed directly into pans near the heat source, drippings from the meat evaporate or burn. In other conventional ovens, the by-products flow to the bottom of the oven, contacting unsanitary surfaces. These drippings are directed into waste collectors to be disposed of. In most conventional ovens, for convenience of emptying, the waste collectors are located outside the cooking chamber so as to be further contaminated. These collected waste products also are exposed to ambient temperatures, which allow the waste products to become rancid or spoiled. In other conventional ovens, the drippings contact the heat source, such as burning wood or heating elements, and burned, generating smoke.

It has been recently recognized, however, that these by-products that previously were discarded or burned, can be used to prepare stock, such as gravy stock, au jus, bastes or marinades. Presently, most commercial food preparation establishments purchase products such as gravy or gravy stock from a commercial supplier, adding cost to finished product. Also, the resulting product is less savory or flavorful than a naturally produced product.

It would be advantageous, therefore, to provide an oven for preparation of food products having means for collecting the savory by-products rendered through the cooking process. Such a collecting means would retain the by-products in a sanitary receptacle and keep the rendered products at an appropriate temperature to retard bacterial growth or spoilage. Such an oven would allow the preparer of the food to lower costs while producing a more tasty product, such as naturally prepared gravies, soup stocks or the like.

Also, it would be advantageous to provide such an oven that not only allows collection and use of the by-products, but also provide multiple forms of cooking, such as heat steam and smoke, to impart greater versatility to the oven. Such an ideal oven would be capable of preparing food products according to a pre-programmed cooking regimen tailored to each particular food product to obtain the optimum results.

SUMMARY OF THE INVENTION

In one aspect of the invention, an oven is provided that includes apparatus for the useful collection of cooking by-products. The oven also provides apparatus for cooking with convection heat, steam and flavored smoke according to pre-programmed cooking protocols or recipes.

In one aspect of the invention, the oven includes an insulated cooking chamber equipped with a plurality of removable racks positioned in a vertical array within the chamber. There is a convection heat source with a circulating fan positioned above the racks. A sanitary by-product collection pan is positioned below the racks to collect by-products rendered through the cooking process. In one aspect of the invention, heat is directed underneath the by-product collection pan to maintain the contents of the pan at a sufficient temperature to retard spoilage. The collected by-products are used to make naturally flavored au jus, gravies, bastes, marinades and the like.

A steam source is positioned below the collection pan. The steam source includes a shielded water reservoir and a heating element. The heating element provides heat in a controlled, pulsed manner so that the water in the reservoir does not overheat and boil away, yet maintains an appropriate temperature to create steam. The steam is maintained at a desired temperature and pressure within the cooking chamber by coordinating the cooking chamber volume, the heat generated by the steam source heating element and amount of heat and steam ventilated from the cooking chamber through an appropriately configured flue.

A flavored smoke generator is positioned near the bottom of the cooking chamber. The smoke generator includes a ventilated receptacle for the placement of flavoring agents, such wood chips, spices and flavoring agents, and a heating element under the receptacle to heat the flavoring agents and create a flavoring smoke or otherwise volatilize the flavoring agents.

The cooking chamber includes a plurality of air flow paths along each inside wall that provide for the optimum circulation of hot air, steam and flavoring to the racks. In one aspect of the invention, at least one of the air flow paths provides for a directed flow of heat, steam and/or flavoring to each of the racks.

The oven includes a programmable controller that independently operates the convection heat source, the steam source and the flavored smoke generator. The controller is programmed to start the convection heat source, the steam source and the flavored smoke generator in any predetermined sequence, and operate them for any predetermined length of time so as to impart optimal cooking and flavoring characteristics to any selected food product.

BRIEF DESCRIPTION OF THE DRAWINGS

FIG. 10 is a perspective view of the inside top wall of the cooking chamber, with the panel partially removed to expose the heating coil and air circulation fan;

FIG. 11 is perspective view of the oven flue; and

FIG. 12 is an exploded view of the fluid reservoir and shield.

DETAILED DESCRIPTION OF THE INVENTION

The following is a detailed description of preferred aspects of the present invention including the best mode of carrying out the invention presently known to the inventor.

Figure 1:
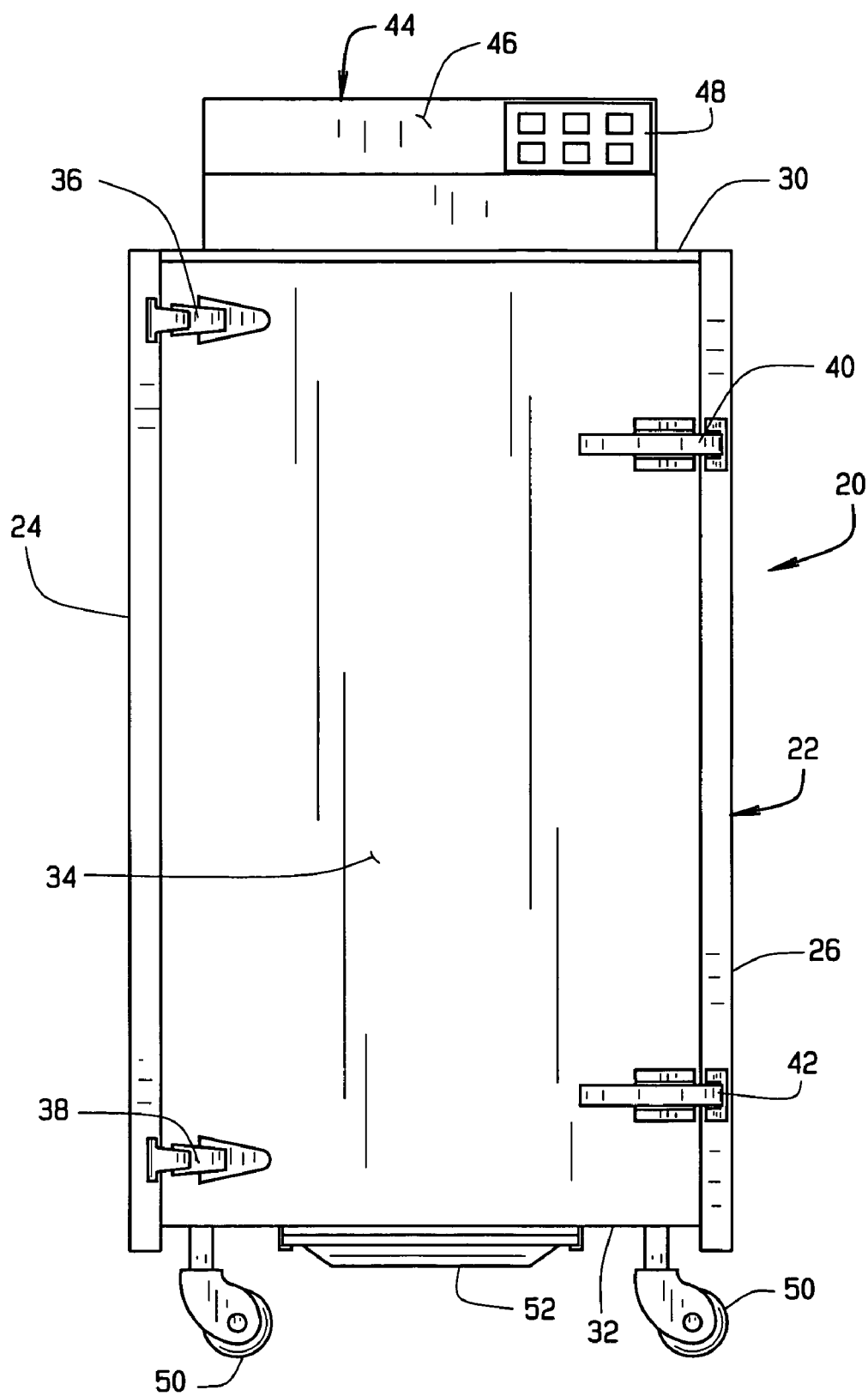
FIG. 1 is a front elevational view of a representative embodiment of the oven of the present invention.
Figure 2:
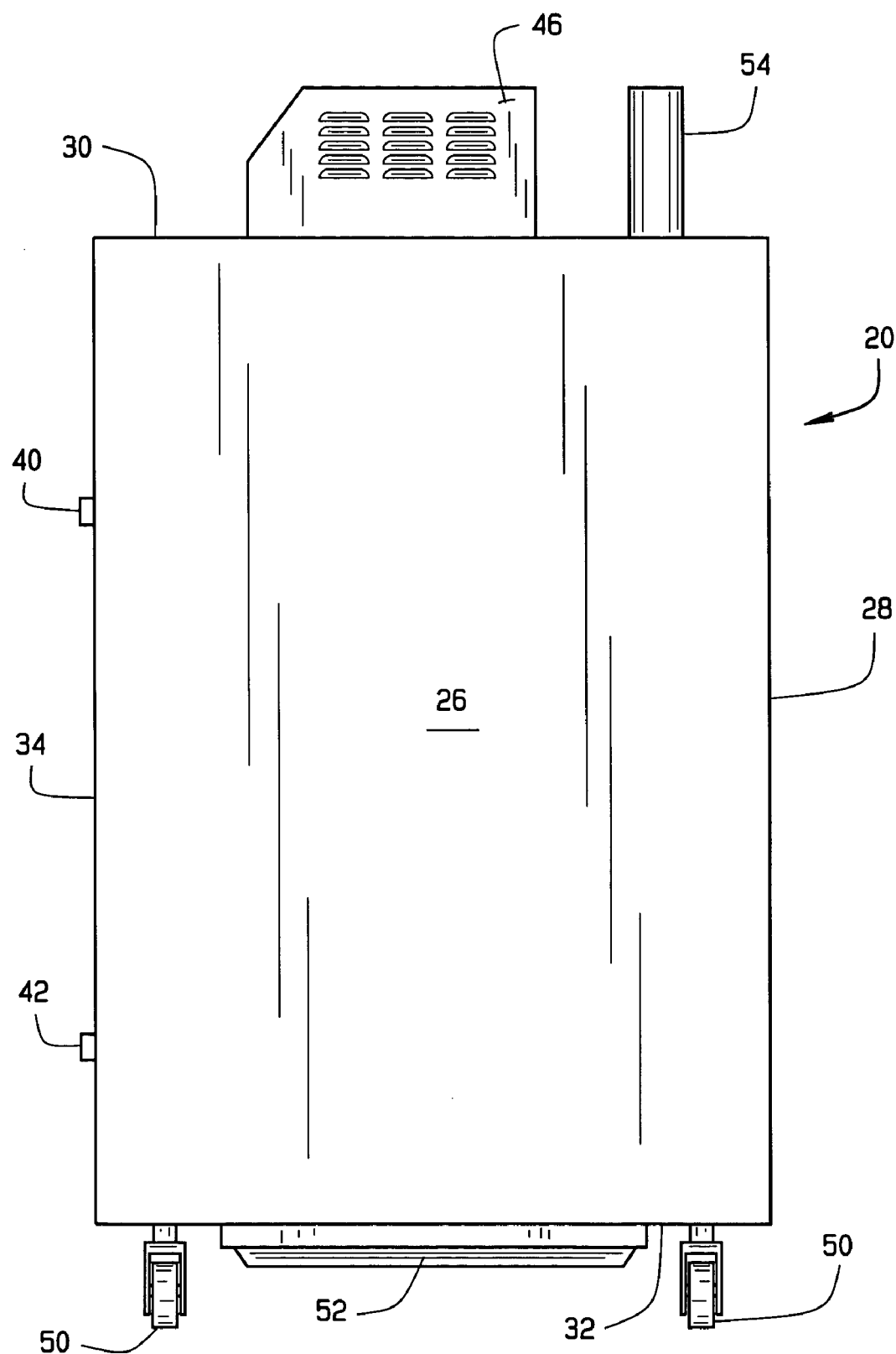
FIG. 2 is a side elevational view thereof.

An oven of the present invention is indicated generally be reference numeral 20 in FIGS. 1 and 2. Oven 20 is designed to prepare food products, generally by cooking with heat, steam, flavored smoke or any combination thereof. The terms "food products" or "food product" is intended to include commonly prepared meats including, but not limited to, beef, pork, poultry, lamb, wild game, as well as fish or other seafood. The terms "food products" or "food product" also can include vegetables, such as ears of corn, potatoes, onions or any other product that may be prepared by one of heat, steam, flavored smoke, or any combination thereof. In other words, the terms "food products" and "food product" is intended to encompass any items prepared in the oven.

Figure 3:
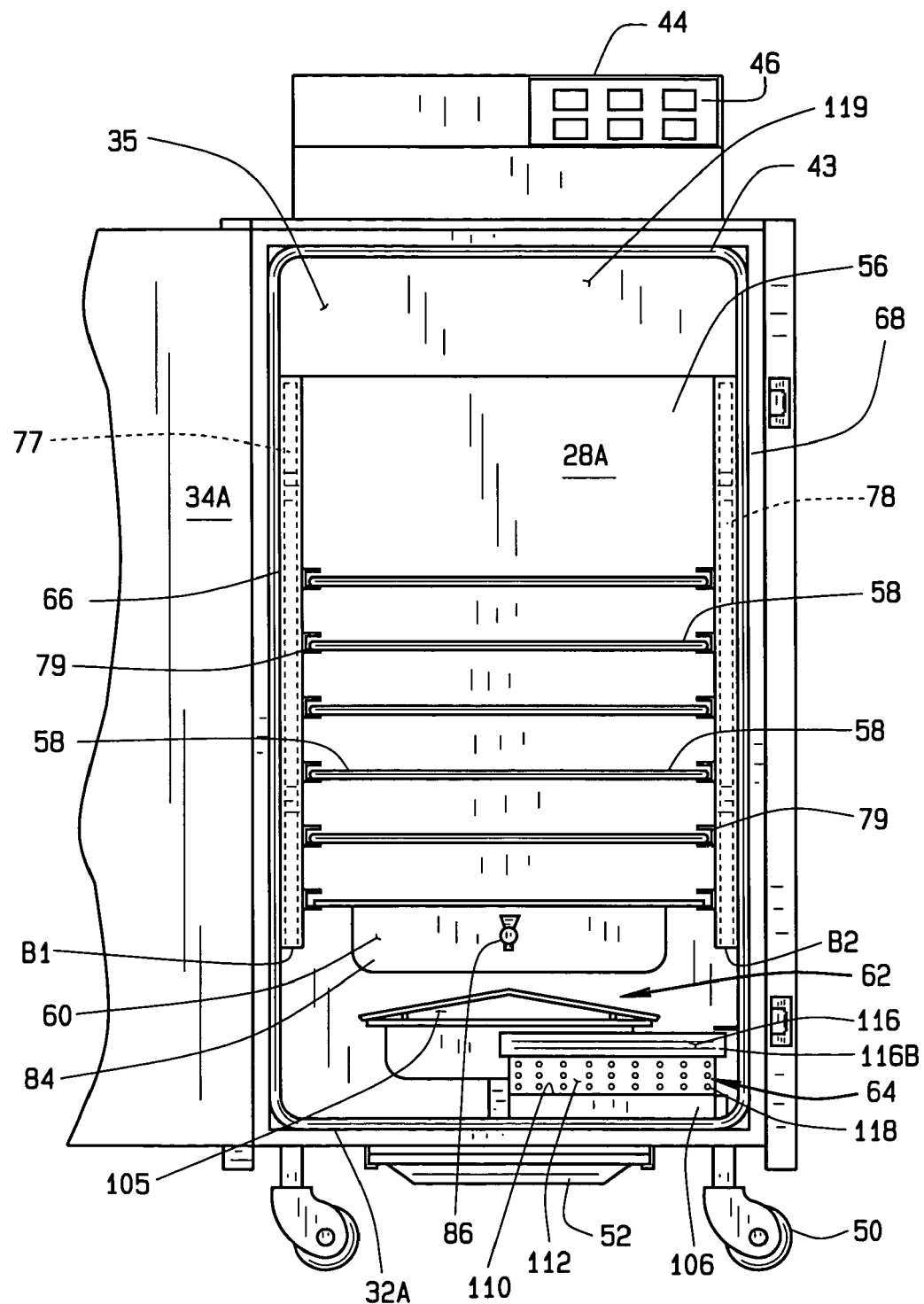
FIG. 3 is a front elevational view of the oven with the door in an open position.

As shown, oven 20 includes a cabinet 22 having a first side wall 24, an opposite side wall 26, a back wall 28, a top wall 30 and a bottom wall 32. Bottom wall 32 includes a waste product drain hole, not shown. The cabinet includes a front door 34 attached by a pair of hinges 36, 38 that provide open access into a preparation chamber that will be described below. Cabinet door also includes a pair of latches 40, 42 that allow tight sealing of the door in a closed position. As seen in FIG. 3, there is a seal 43 around the doorway so as to better provide for sealed closure of the cabinet.

As shown, oven 20 includes a power unit 44 positioned on top wall 30. It will be understood that the power unit illustrated has ventilated shroud 46 that houses a fan drive motor (not shown) and programmable controller (not shown) The user can operate the programmable controller through keypad 48.

The programmable controller, at a minimum, is the type that can be programmed to independently actuate or operate a number of separate functional elements of oven 20, such as an air circulation fan and separate heating elements. In general, the controller is capable of actuating and/or operating a fan and a plurality of heating elements, independently, in any desired sequence and for any desired duration of time, in response to a predetermined keypad entry. These operational sequences and durations can be referred to as cooking regimens and are customized for specific food products. One type of representative programmable controller is available commercially from Watlow Electric Manufacturing, Co., St. Louis, Mo.

It will be understood by one skilled in the art that the fan drive motor (not seen) housed in shroud 46 can be any appropriate type of electric motor sufficient to drive an air circulation fan of the type that will be described below.

Four casters 50, support cabinet 22 one under each corner, which impart mobility to the oven. There is waste product drain pan 52 under the waste product drain hole in bottom wall 32 to collect any unusable by-products of cooking. The cabinet includes a ventilation flue 54 that extends through the top wall to control the escape of heat and steam, as will be described in greater detail below.

The various elements of oven 20 generally are fashioned from stainless steel. For example, the side walls 24 and 26, back wall 28, bottom wall 32 and door 34 have outer and inner stainless steel sheets with insulation between the sheets. Consequently, walls 24, 26, 28 and 32 and door 34 have interior wall surfaces that can be seen and designated as 24A, 26A, 28A, 32A and 34A, respectively. Top wall 30 has a somewhat different construction that will be discussed below. It will be appreciated that elements inside the cabinet, which will now be described, typically are fashioned from stainless steel to allow for proper cleaning and sanitation.

FIG. 3 provides a view of the inside of cabinet 22. Cabinet 22 includes an inner food product preparation chamber 56 defined by the recited inner walls 24A, 26A, 28A, 32A, the inside surface 34A of door 34 and top inside panel 35. Chamber 56 also can be referred to as a cooking chamber, particularly when food products in the chamber are subjected to heat and thereby cooked in the conventional sense.

In one preferred embodiment, cooking chamber 56 has a volume of between approximately 14 cubic feet and approximately 18 cubic feet. A plurality of racks 58 are aligned in a vertical array, generally centrally positioned within cooking chamber 56. Racks 58 can be conventional, stainless steel oven racks designed to support food products inside the cooking chamber. There is a by-product collection pan 60 positioned under the racks. A steam source 62 is located under collection pan 60. A flavor generator, indicated generally by reference numeral 64, is mounted adjacent the bottom wall 32A, towards the front of the cabinet. These particular structures will be described in greater detail below.

Figure 4A:
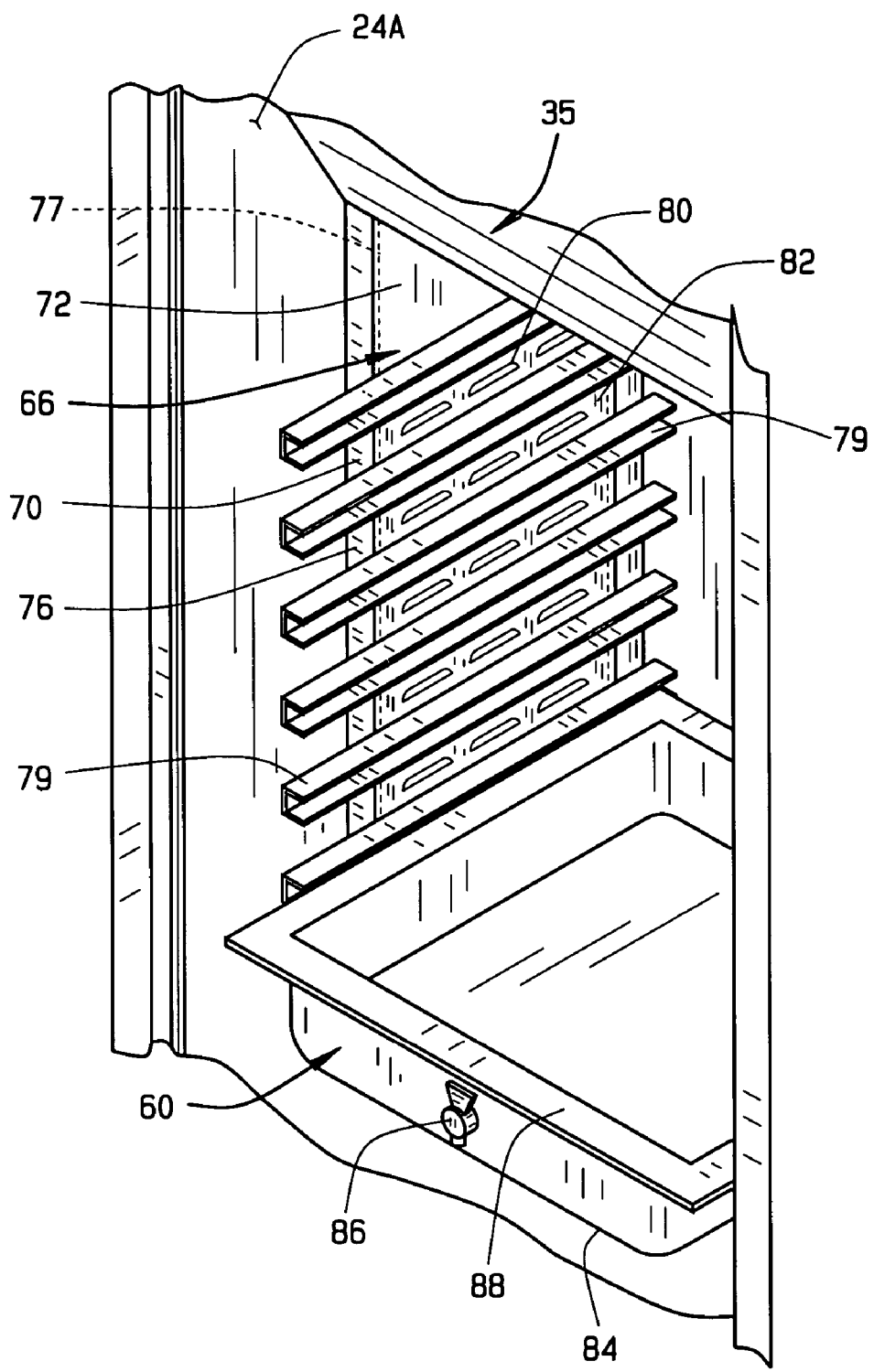
FIG. 4A is a perspective view of one inside wall of the oven.

Racks 58 are supported within the cooking chamber by rack mounting apparatus 66 and 68 that are mounted on the inside of walls 24A and 26A, respectively. Rack mounting apparatus 66 and 68 are shown in greater detail in FIGS. 4-6. Each mounting apparatus includes a substantially rectangular body 70. Body 70 has a front wall 72 and opposed sidewalls 74, 76. There is no back wall, top or bottom wall. Consequently, when the rack mounting apparatus is attached to wall 24A and 26A, front wall 72 is spaced away from the cabinet wall by the sidewalls 74,76. Thus the rack mounting apparatus body walls 72, 74 and 76, along with the cabinet wall 24A, 26A, define open-ended channels 77, 78 extending down each cabinet wall 24A and 26A, respectively.

There is a series of spaced apart, horizontally extending, elongated U-shaped tracks 79 attached to front wall 72 on each rack mounting apparatus 66 and 68. As illustrated in FIG.3, when rack mounting apparatus 66 is attached the inside cabinet wall 24A and rack mounting apparatus 68 is attached to the inside of cabinet wall 26A, the respective tracks 79 of each rack mounting apparatus are in opposed horizontal alignment. Each rack 58 can slide into a pair of opposed tracks 79 for mounting in the cooking chamber.

There is a plurality of ventilation slots 80 in the front wall 72 of each rack mounting apparatus. Slots 80 open into channels 77 and 78. In the illustrated embodiment, there is a horizontal row 82 of three slots 80 under each track 79 to provide desired circulation of air, smoke or steam to the racks from channels 77 and 78, as will be explained below.

It will be appreciated that racks 58 are removable and replaceable by sliding them in and out of the tracks 79. Thus, the user can arrange as many racks as he or she desires, and in any desired configuration. A plurality of racks in a vertical array may be optimal for preparing relatively low profile items such as ribs. However, the user can remove racks to create more vertical space between racks if he or she intends to prepare bulkier food products, such as a standing round of beef.

Figure 6:
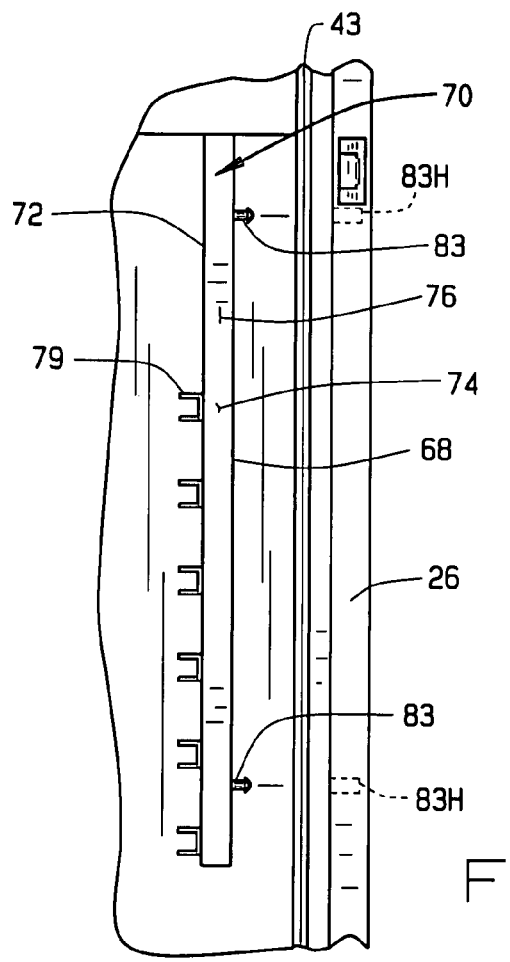
FIG. 6 is a perspective view of the inside wall of FIG. 5, with the rack mounting apparatus partially removed.

As seen in FIG. 6, each rack mounting apparatus 66, 68 can be mounted to the wall 24A or 26A by studs 83 engaged in holes 83H in the walls. The rack mounting apparatus then is removable to allow for sanitation of the apparatus and cooking chamber walls, particularly the airflow paths 77, 78. Although this is a desirable construction, the oven of the present invention can employ rack mounting apparatus, and indeed racks themselves, that are not removable from the cooking chamber.

Although the illustrated embodiment rack mounting apparatus works well, any configuration of the tracks or mounting apparatus that provides for the support of racks 58 within the cooking chamber is encompassed by the scope of the invention. Likewise, although the openings in the mounting apparatus front wall 72 are shown as slots 80, these opening can be of any configuration, such as round holes, ovals, rectangles or the like. Moreover, although in the illustrated embodiment, the slots are arranged in horizontally extending rows 82 beneath tracks 79, any arrangement of openings that functions to provide a flow of heat, steam or smoke to the racks is acceptable and within the scope of the invention.

The by-product collection pan 60 is positioned below the vertical array of racks. Pan 60 is generally rectangular in shape and dimensioned such that the expanse of the pan is substantially the same as that of racks 58. In general, pan 60 has a relatively deep container section 84 surrounded by a generally flat, perimeter frame 85. In the illustrated oven, frame 85 is slidingly engaged in the bottom most track 79. However, it is contemplated by the inventor that interior cabinet walls 24A and 26A could include separate mounting hardware to removably secure pan 60 below the racks.

It is recognized by one skilled in the art, that during preparation of food products supported by the racks 58, various by-products, such as juices, fat and other liquids are rendered from the products. Pan 60 is positioned so that almost all of the rendered by-products drip or flow into the container section 84 of the pan. Pan 60 has a spigot 86 in the front of container section 84 near its bottom. During use, spigot 86 is used to drain usable by-products from pan 60, without removing the pan from the oven. This allows for safe and convenient removal of hot, liquid by-products. It also allows emptying of the pan during a cooking cycle in the event the food products produce copious amounts of rendered by-products during preparation.

If, for some reason there is an overflow of by-products, or there is splattering of by-product that misses pan 60, that by-product would flow to the bottom of the cooking chamber, out of the drainage hole, into drain pan 52 to be collected as waste product.

It will be understood that the positioning of pan 60 allows the collection of the renderings in the pan without burning or evaporation. Pan 60 is sufficiently low in the oven to avoid too much heat from the primary heat source. Furthermore, pan 60 is not positioned too near other heating elements that will be described hereinafter. Moreover, being positioned above steam source 62 subjects pan 60, and its contents, to wet heat, which prevents evaporation and/or burning.

Figure 7:
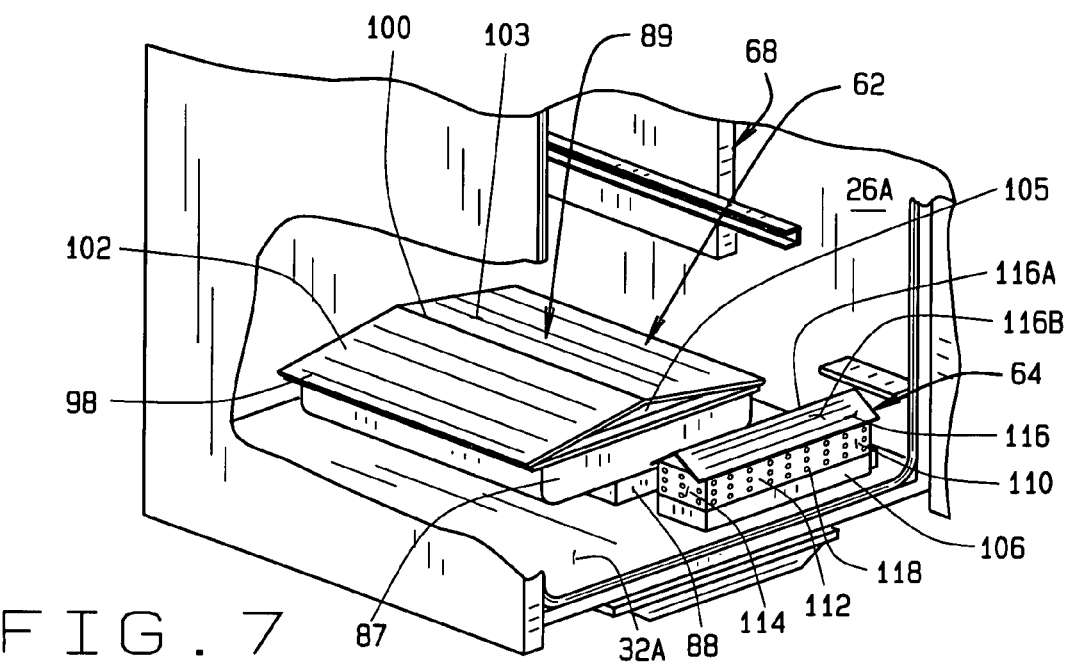
FIG. 7 is a perspective view of the lower section of the cooking chamber.
Figure 8:
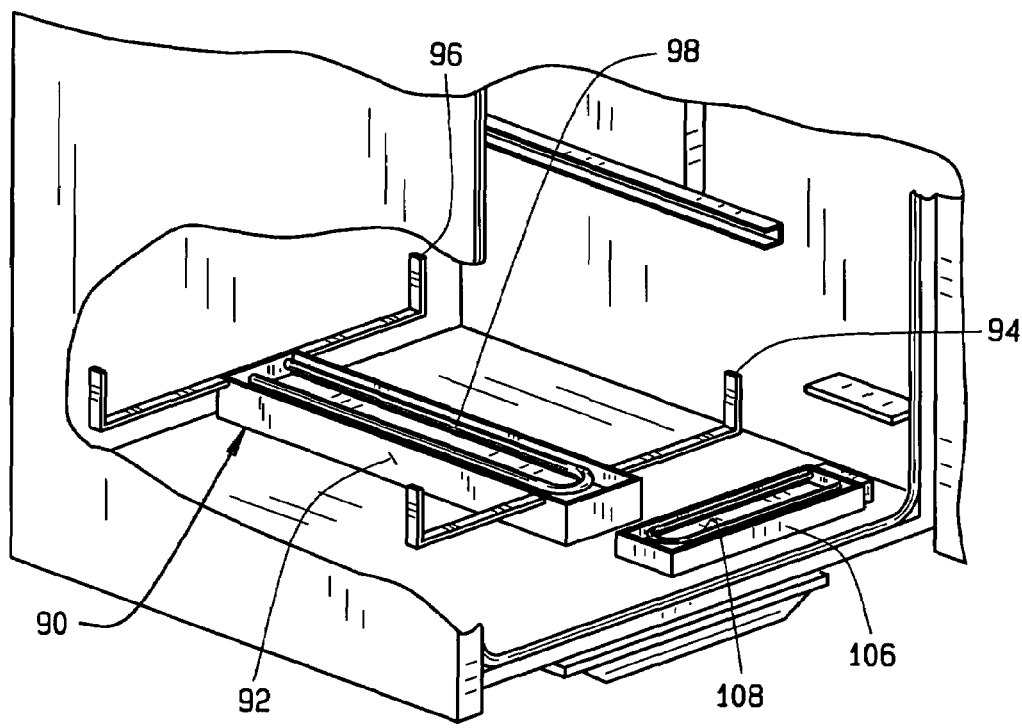
FIG. 8 is another perspective view of the lower section of the cooking chamber with the fluid reservoir and the flavoring receptacle removed.

FIGS. 7, 8 and 12 illustrate steam source 62. Steam source 62 includes a reservoir 87, a heat source 88 and an optional shield 89. Reservoir 87 is a generally rectangular pan designed to hold liquid, such as water. Reservoir 87 is seated in a removable bracket 90. Bracket 90 has a center frame 92 and a pair of opposed front L-shaped arms 94 and pair of opposed rear L-shaped arms 96. Reservoir 87 is positioned on frame 92 and supported laterally by arms 94 and 96. Frame 92 is dimensioned to accommodate an elongated, U-shaped electric heating element 98, which is operatively connected by appropriate wiring to a source of electric current and to the controller.

Heating element 98 is positioned substantially centrally under the bottom of reservoir 87 when the reservoir is seated on bracket 90. Heat from the heating element 98 is used to heat water in the reservoir and generate steam. It will noted that in one aspect of the invention, heating element 98 is introduced into the cooking chamber through an opening in the back wall. If the heating element needs to be serviced or changed, it can easily and quickly be removed from outside the cabinet.

Shield 89 is shown in FIG. 12. Shield 89 includes a deflector 100 having a center ridge 101 downwardly disposed panels 102 and 103. There are four supports posts 104A, 104B, 104C and 104D extending down from the deflector. The support posts are of sufficient length so that when they are set into reservoir 87 deflector 100 rests on the edges of the reservoir and the center ridge rises above the reservoir creating a gap or opening 105 at each end of the reservoir, as seen in FIGS. 3 and 7, for the escape of steam. Furthermore, any random drippings that strike shield 89 will be directed downwardly toward the bottom of the chamber.

A preferred embodiment of a flavor generator 64 is illustrated in detail in FIGS. 3, 7 and 8. Flavor generator 64 includes an elongated, narrow rectangular bracket 106 that is mounted to the inside wall 26A. A generally U-shaped electric heating element 108, which is operably connected to a source of electricity, is also attached to the wall and positioned within bracket 106. As with the previously described heating element, heating element 108 can be inserted into the cooking chamber from the outside through an opening in wall 26 for ease of service or replacement.

In any event, there is a flavoring agent receptacle 110 removably positioned atop bracket 106. As shown, receptacle 110 is a ventilated rectangular box having opposed side walls 112, opposed end wall 114, a removable top 116 that rests on the side and end walls, and a bottom wall or floor (not shown). There is a plurality of openings, as at 118, formed in the side and end walls to allow the escape of flavored smoke or vaporized flavorings.

Top 116 has two downwardly sloping sections 116A and 116B. This design permits any waste products that do strike the receptacle to flow downward toward bottom wall 28. Top 116 rests on the other receptacle walls and can be lifted off to provide access to the inside of receptacle for the placement of flavoring agents, such as wood chips, spice, oils or the like. Heating element 108 is operatively connected to the controller and provides appropriate heat to the bottom of the receptacle so as to heat the flavoring products to generate flavored smoke and to vaporize volatile oils in the flavoring agents. Placement of flavor generator 64 adjacent the bottom of the cooking chamber allows the flavored smoke or vaporized flavors to rise up among racks 58 to contact and flavor the products on the racks.

Figure 9:
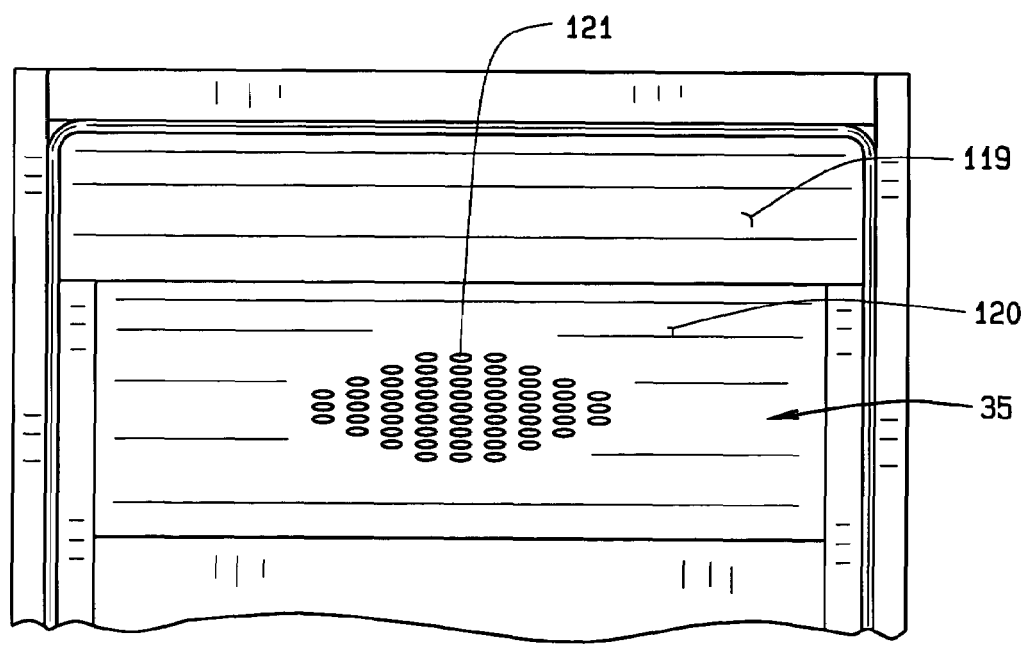
FIG. 9 is a perspective view of the top wall of the cooking chamber.

FIGS. 9 and 10 illustrate those elements of oven 20 that provide a primary cooking heat source, convection heat, as well as the circulation of heat, steam and flavoring agents within the cooking chamber. FIG. 9 is a perspective view of the exposed surface of the top inside panel 35 of the cooking chamber. As illustrated, panel 35 has a downwardly and inwardly disposed face place 119 and a flat, horizontal wall 120. There is a plurality of air holes 121 in wall 120. Face plate 119 and wall 120, along with back wall 28A and top wall 30, define a chamber 122. FIG. 10 shows panel 35 partially removed. There is a generally centrally positioned circular flange 123 surrounding holes 121. An air circulation fan 124 is positioned above panel 120. Fan 124 is suspended from the fan drive motor (not seen) housed above the cabinet in power unit 44, as described above, and driven through shaft 126 There is a coil-type heating element 128 surrounding fan 124.

Fan and heating coil 128 are housed in chamber 122 and are of an appropriate diameter so as to fit into, and be partially encircled by flange 123. In another aspect of the invention, the drive motor, fan and heating element can be mounted as an assembly on a removable chassis so that the entire assembly can be removed from the oven through an opening in top wall 30. This arrangement provides for efficient and cost effective replacement of the fan, motor or coil in the event of failure or malfunction.

In any event, fan 124 and heating element 128 are operatively connected to a source of electricity and also operatively connected to the programmable controller so that the user can control operation of fan 124 and heating element 128. In general, convection heat source provides heat up to approximately 325° in a preferred aspect of the invention. In that design, oven 20 is equipped with an automatic shut off of heating element 128, in the event the temperature within cooking chamber exceeds a predetermined temperature, for example, 340° F. However, oven 20 can be equipped with a convection heat source that generates cooking temperatures in excess of 340° F., if there is application for higher temperatures.

FIG. 11 better illustrates novel aspects of flue 54. In a preferred aspect of the invention, flue 54 is comprised of a tubular wall 130 defining an inner bore 132 of a predetermined diameter D1. A first end of the flue 133 having opening 134 opens into chamber 121 and the opposite end 135 extends out of the cooking chamber. There is a baffle 136 in end 135 of the flue that includes a centrally positioned discharge opening 138 of a predetermined diameter D2 that is less than the diameter D1 of bore 132. This relative size differential between the inside diameter D1 of the flue and the diameter D2 discharge opening 138 is calculated to control heat and steam pressure within the cooking chamber, as will be explained. In a preferred embodiment of the invention, the inside diameter of the flue, i.e. diameter D1 of bore 132, is approximately 2 inches, with discharge opening 138 in baffle 136 having a diameter D2 of approximately ¾ inch.

Referring back to FIGS. 3, 4, 5A and 5B, several additional novel aspects of the oven of the present invention will be apparent. In operation, coil-type heating element 128 can produce heat for cooking, particularly for searing and sealing food products. Steam source 62 can produce steam for additional cooking and/or tenderizing of the food products. Additionally, flavor generator 64 can produce flavored smoke or volatilized flavors to add flavor to the products. Circulation fan 124 can create airflow within cooking chamber 56 to circulate the heat, steam and flavors among the food products.

For example, fan 124 will force heated air through holes 121 and down toward the food products, while creating an updraft that draws the steam and flavorings upward through holes 121 and into chamber 122, surrounding the fan and heating element 128. The heat, steam and flavors are mixed and redistributed to the products. Appropriate amounts of steam and heat are vented through flue 54.

Oven 20 of the present invention, however, has several novel features that optimize the use of heat, steam and flavorings. First, as described above, the rack mounting apparatus walls and the cabinet wall define an open-ended channel extending down the cabinet wall. These channels provide air flow paths 77 and 78 downward so that heat, steam and/or flavorings pushed down by fan 124 enter these channels. The heat, steam and/or flavoring are distributed among the racks, and thus the food products, through slots 80.

Figure 4B:
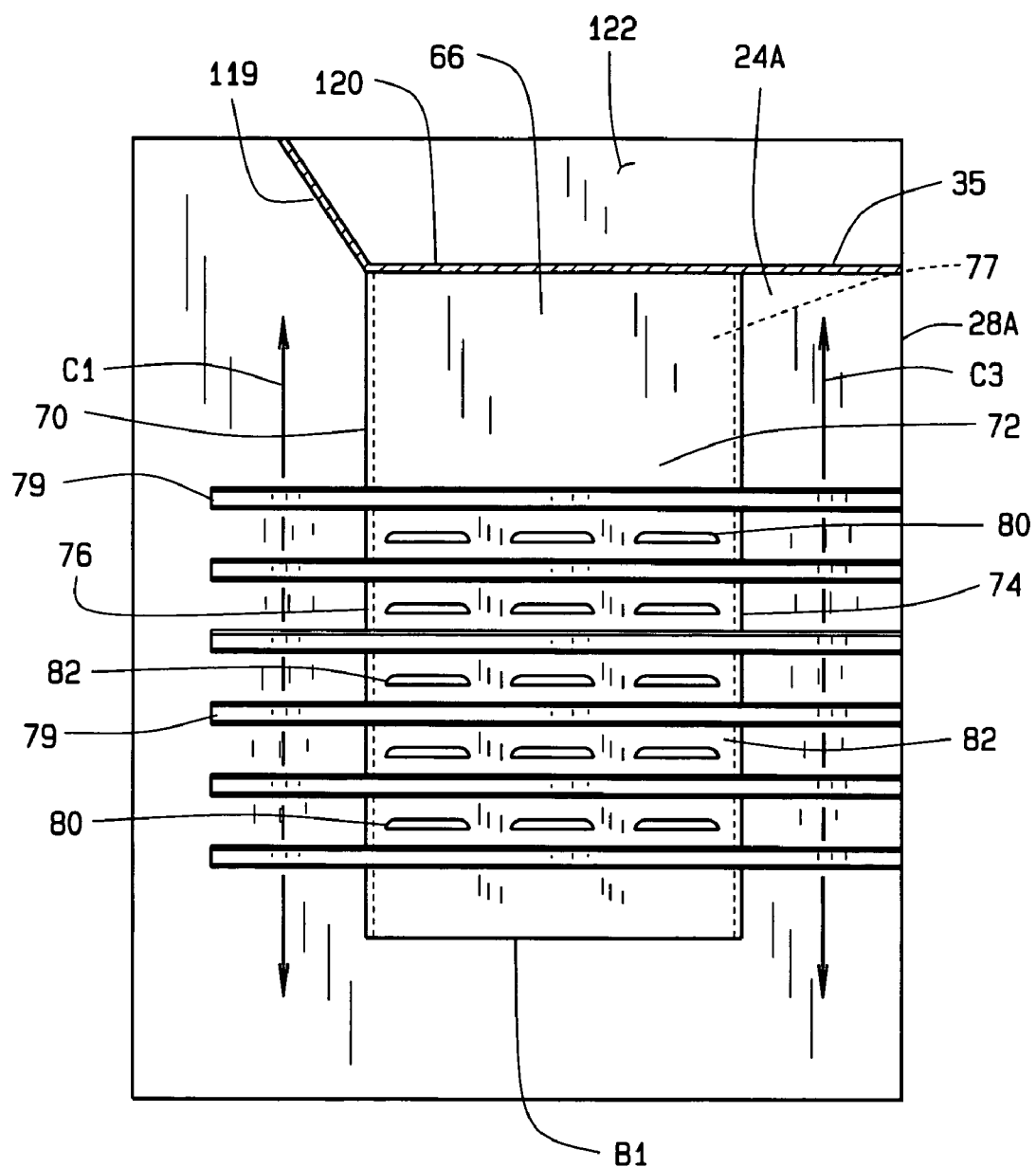
FIG. 4B is a front plan view of the wall of FIG. 4A.
Figure 5A:
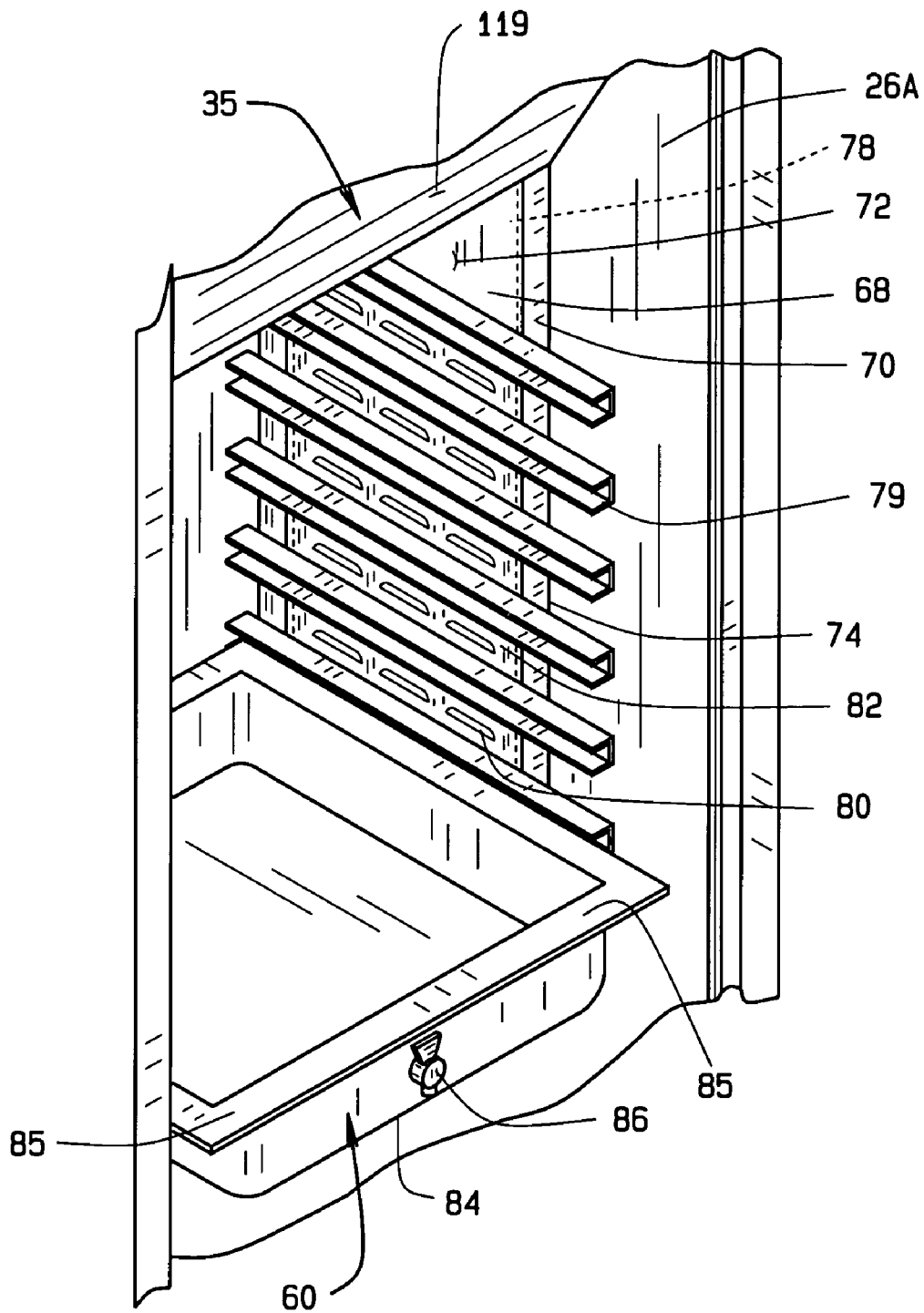
FIG. 5A is a perspective of the opposite inside wall of the oven.
Figure 5B:
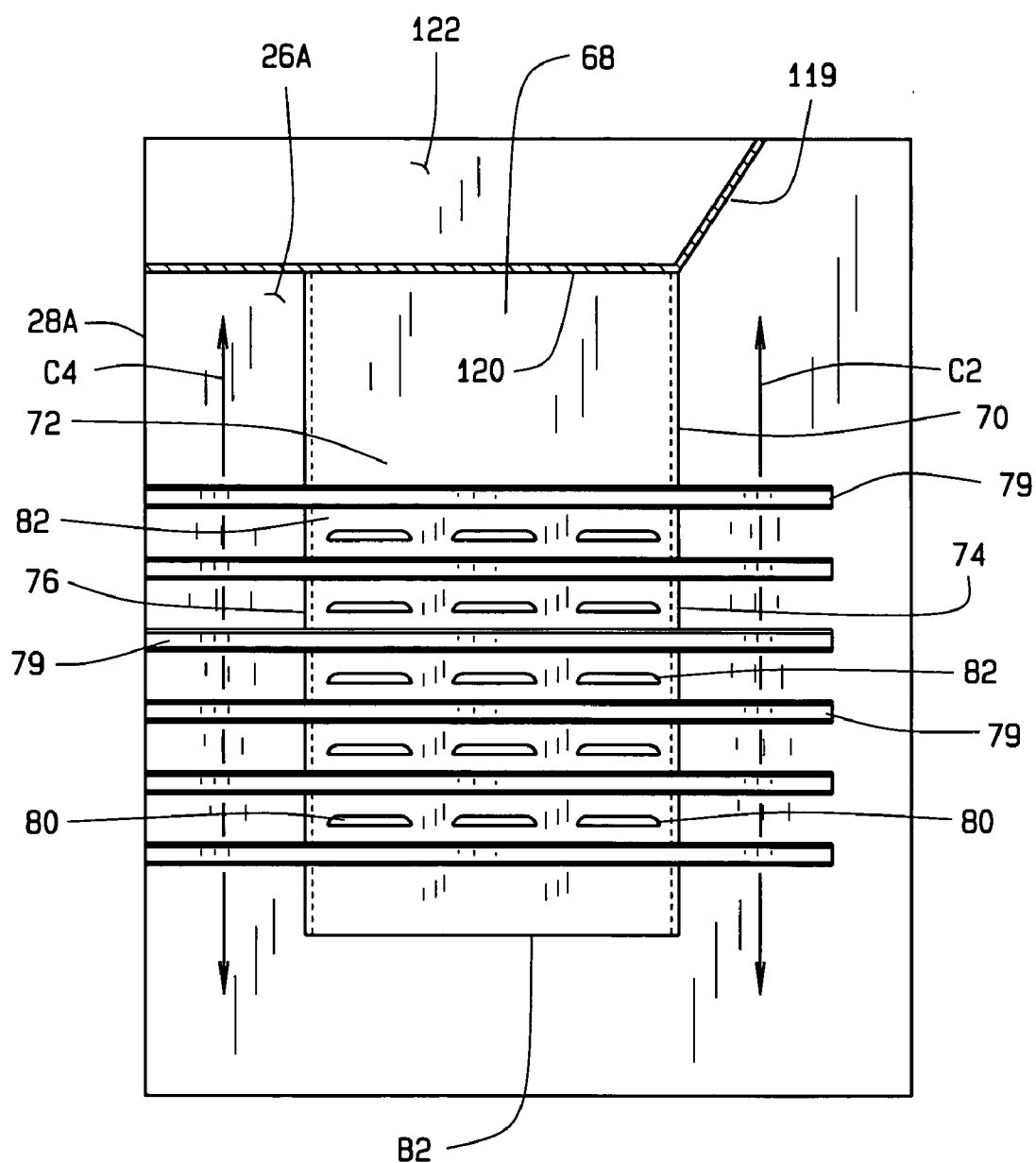
FIG. 5B is a front plan view of the wall of FIG. 5A.

As can best be seen in FIGS. 3, 4B and 5B, the bottoms B1 and B2 of rack mounting apparatus 66 and 68, respectively, terminate under the lowest rack. Consequently, heat, steam and or flavorings also are delivered through flow paths 77 and 78 and discharged below the racks so that fan 124 can draw the heat, steam and flavorings back up through the racks laden with food products.

Furthermore, referring to FIGS. 4B and 5B, it will be understood that there is a defined space or clearance C1 and C2 between the body 70 of the rack mounting apparatus 66 and 68, respectively, and the front of cooking chamber 56 and door 34 and between the front ends the racks 58 and side walls 24A and 26A, respectively. Similarly, there clearance C3 and C4 between the rear of body 70 of rack mounting apparatus 66 and 68, respectively, and back wall 28A of the cabinet and, consequently, and between the rear ends rack racks 58 and walls 24A, 26A. These areas of clearance C1, C2, C3 and C4 provide fluid flow paths from the top to the bottom of the cooking chamber, and vice versa, so as to optimally distribute pick-up air to steam generator 62 and flavor generator 64 and also distribute heat, steam and/or flavored smoke among the racks and hence the products on the racks.

One important aspect of the oven of the present invention is the novel interrelationship of the elements to produce a prepared food product of having optimum flavor and texture characteristics. For example, the flavor and texture characteristics of any given product can be controlled by the length of time the product is subjected to heat, steam or flavored smoke. In some instances, the products only are subjected to convection heating, other products or recipes require, only steam. Yet other products, for example salmon, are prepared only by smoking without heat or steam.

The inventor has determined, and is in the process of further determining, the optimal cooking regimens for assorted or selected food products. These cooking regimens then are programmed into the controller. The user then can fill reservoir 87, if the regimen calls for steam, place flavoring agents in flavor generator 64, if called for, load the products on racks 58, close door 34, push the appropriate keys on keypad 48, and oven 20 will run through the desired cooking cycle.

The following is an example of a cooking cycle for one selected food product and should be considered illustrative only, and not limiting. As one skilled in the art will readily recognize, the number or preprogrammed cooking cycles or regimens virtually is unlimited, and development of product-specific cooking regimens can be ongoing.

In any event, as an example, the chef places food product on the racks. The products are evenly distributed and spaced out among the racks 58. The programmable controller is preprogrammed to optimally prepare the selected food product. In this example, the chef enters the appropriate code into keypad 48 and the cooking cycle begins. For example, the controller actuates the heating element 128 and air circulation fan 124 until the appropriate temperature inside cooking chamber 56 is reached and maintained. Fan 124 is actuated to distribute heated air within the cooking chamber, for example, it is forced down the air channels 77, 78 behind rack mounting apparatus 66 and 68 and out of slots 80 so as to circulate around each rack 58.

Heated air, as well as steam and volatilized flavorings, pass through air channels 77, 78 and is discharged out of the bottom B1 and B2 of rack mounting apparatus 66, 68 respectively. This is an important feature of the present invention. The positioning of these discharge areas at the bottom of the rack mounting apparatus assures that heat will contact by-product collection pan 60. This aspect of the invention allows the temperature of pan 60, and its contents, to stay at or above an appropriate temperature to retard spoilage of by-products collected in the pan.

Because too much heat, alone, can dry the food, at an appropriate time in the cooking cycle, the controller actuates heating element 98 of the steam source so as to provide sufficient heat to create steam. Another novel aspect of the present invention is the fact that the inventor has determined that the convection heat already will have heated the water in reservoir 84 to a predetermined level. Consequently, to have steam generated at the appropriate point in the cooking cycle, the controller has to actuate heating element 98 at the appropriate time so as to begin generating steam from pre-heated water. In a preferred aspect of the invention, steam source 62 provides un-pressurized steam at 212° to 214°.

Moreover, the inventor has determined that prolonged actuation of heating element 98 can generate steam to a point where reservoir 87 goes dry. In another aspect of the invention, the heating element 98 is actuated in a pulsed or "on and off" mode, so as to provide sufficient heat to produce the desired amount of steam, but not boil the reservoir dry. In a preferred embodiment of the present invention, one filling of reservoir 87 can provide steam for eight (8) hours without going dry.

It is known in the art that too much steam can break down food products, such as meat, ruining the consistency and flavor of the product. Hence, as stated above, steam source 62 produces un-pressurized steam. However, it is known, that confined steam will produce pressure. The novel design of flue 54 allows for maximum utilization of steam within cooking chamber 56 without developing pressure that breaks down product. As described above, flue 54 shown in detail in FIG. 11, allows escape of heat and pressure from the cooking chamber to the atmosphere. However, if too much heat and steam are released, the products will not be properly cooked. If not enough steam and heat are vented through flue 54, the food products will break down. The inventor has determined that the described flue, having an inside diameter of approximately two (2) inches with a restricted discharge opening of approximately ¾ inch, results in optimal escape of heat and steam.

Also, the size of heating element 98 and the pulsed operation of the heating element are balanced with the flue dimensions and volume of cooking chamber 56, while also taking into consideration the heating of water in reservoir 84 by the convection heat source to produce the optimal amount of steam and pressure. This balancing of variables imparts optimum food preparation characteristics to oven 20.

It will be understood that desired flavoring agents are placed in perforated receptacle 110 At a predetermined time in the cooking cycle, the controller will actuate heating element 108 of the flavor generator. The heat from element 108 will generate flavored smoke which escapes through openings 118 into the airflow within the cooking chamber, to be distributed to the food products. Heat to the flavor generator can be continuous or pulsed, as required.

In addition to the previously describe air circulation patterns, fan 124 circulates air throughout cooking chamber 56 all the way to the bottom of the cooking chamber where it is circulated around steam source 62 and flavor generator 64. The circulating air is saturated with steam and flavoring agents and drawn back up to the through holes 121 into chamber 122 to be mixed and forced back out to be re-circulated around the food products. It will be noted that the existence of clearance paths C1-C4, as well as flow paths 77, 78, facilitate this circulation and re-circulation of air within cooking chamber 56. Fan 124 not only forces air downwardly, as described above, but also pulls the air up along paths C1-C4 through holes 121 in panel 122 to the fan to be re-circulated. Consequently, oven 20 includes a predetermined airflow pattern that allows an optimal and continuous distribution of heat, steam and or flavoring to the food products.

By-product collection pan 60 is positioned below the array of racks 58 so to as to collect by-products rendered from the food products, such as drippings and the like. As shown, pan 60 has a spigot 86, which allows for the safe and convenient removal of the liquefied by products from pan 60. The accumulated by-products can be used to prepare a myriad of useful products including au jus, gravies, marinades, basting liquids or the like. The accumulated by-products contain natural food flavors, as well as the flavors of the flavoring agents or smoke.

It is possible, with the present invention, to render useful by-products with a variety of flavors. For example, by the selection of the food product and/or the flavoring agents, a chef can control the flavor of the product. Also, for example, the user can employ mixed food products, such as two or more different meats, meats plus vegetables, onions or the like, that will render useful by-products that have a unique combination of flavors. By using the collected by-products, the food preparer can save money, as well as produce a more savory, natural product, such as a natural au jus or gravy.

In other recipes, because pan 60 is sanitary, food products can be placed in the pan prior to initiating the cooking cycle. The rendered by-products are collected in the pan, and used as a stock for cooking the food products in pan 66.

It will be noted that oven 20 can be used to prepare foods by any one of the described methods or any combination thereof. For example, oven 20 can be used to prepare foods only be convection heat. Likewise, oven 20 can be used to prepare food products only by steam or only be smoking. Oven 20 can be used to prepare foods by a combination of convection heat and smoking or convection heat and steaming. Moreover, oven 20 can be use to prepare foods by steam and smoking. The duration of time that the heat, steam and/or flavor is generated can be varied according to recipe and can be programmed into the programmable controller, for retention and ease of use.

It will be appreciated by those skilled in the art that various changes and modifications can be made in the oven of the present invention without departing from the scope of the appended claims. By way of example, the illustrated embodiments used electric heat elements as the source of heat for the convection heat source, the steam generator, and the flavor generator. Any one of these heat sources could be an alternative heat source, such as a gas or wood burner. The term heat source or heating element, unless specifically described as an electric heating element is intended to include an appropriate source of heat. Therefore, the foregoing description of preferred aspects and embodiments of the present invention, which represent the best mode of working the invention know at this time, are intended to be illustrative only, and should not be construed as limiting the invention to any specific embodiment.

What is claimed:

1. A multifunctional food preparation apparatus for the preparation of food products, comprising:
    a preparation chamber having a top and a bottom;
    at least one rack within the preparation chamber to support products to be prepared in the apparatus;
    a main heat source positioned adjacent the top of the preparation chamber;
    a collection pan within the cooking chamber underneath substantially all of the at least one rack to collect by-products rendered from the food products during preparation;
    a steam source below the collection pan;
    a flavor generator adjacent the bottom of the preparation chamber below the at least one rack;
    at least one air flow path within the preparation chamber to circulate air around the at least one rack; and
    a programmable controller operatively connected to the heat source, the steam source and the flavor generator, the controller being programmable to operate any one of the heat source, the steam source and the flavor generator in any predetermined sequence, and for any predetermined duration for preparation and flavoring of the products.

2. The multifunctional food preparation apparatus of claim 1 further comprising an external flue in fluid communication with the preparation chamber, said flue being appropriately dimensioned so as to maintain a predetermined pressure within the preparation chamber.

3. The multifunctional food preparation apparatus of claim 2 wherein the flue further comprises a tubular body defining an internal bore, said tubular body having a first end in fluid communication with the preparation chamber and a second end defining an opening into the atmosphere, the internal bore and said opening in said second end of the tubular body each having a predetermined internal diameter that combine to maintain the predetermined pressure within the preparation chamber.

4. The multifunctional food preparation apparatus of claim 3 wherein the internal diameter of the internal bore is approximately 2 inches and the internal diameter of the opening in the second end of the tubular body is approximately ¾ inch.

5. The multifunctional food preparation apparatus of claim 4 wherein the preparation chamber has a volume of between approximately 14 cubic feet and approximately 18 cubic feet.

6. The multifunctional food preparation apparatus of claim 1 wherein the at least one air flow path includes at least one vent that directs heated air toward the collection pan to maintain the collection pan at a sufficient temperature to retard spoilage of the by-products collected in the collection pan.

7. The multifunctional food preparation apparatus of claim 1 wherein the at least one airflow path is positioned so as to direct airflow to the flavor generator.

8. The multifunctional food preparation apparatus of claim 1 wherein the steam source further comprises a reservoir and a heat source.

9. The multifunctional food preparation apparatus of claim 8 wherein the steam source heat source is an electric heating element operatively connected to the controller.

10. The multifunctional food preparation apparatus of claim 8 wherein the steam source further comprises a shield positioned over the reservoir.

11. The multifunctional food preparation apparatus of claim 1 wherein the flavor generator further comprises a flavoring receptacle and a heat source.

12. The multifunctional food preparation apparatus of claim 11 wherein the flavor generator heat source further comprises an electric heating element operatively connected to the controller.

13. The multifunctional food preparation apparatus of claim 1 wherein the main heat source further comprises an electric heating element and a fan operatively connected to the controller.

14. A multifunctional food preparation apparatus for the preparation of food products, comprising:
    a food product preparation chamber having a top wall, a bottom wall, a first vertical side wall and a second vertical side wall;
    a first rack mounting structure on said first vertical side wall defining an airflow pathway and a second rack mounting structure on said second vertical side wall defining an airflow pathway;
    at least one rack within the preparation chamber extending between said first rack mounting structure and said second rack mounting structure to support food products to be prepared in the apparatus;
    a main heat source positioned adjacent the top wall of the preparation chamber;
    a collection pan within the cooking chamber and extending between said first rack mounting structure and said second rack mounting structure below the at least one rack to collect by-products rendered from the food products during preparation, said collection pan including a spigot;
    a steam source below the at least one rack and the collection pan, the steam source having a heating element, a reservoir and a cover;
    a smoke generator having a heating element at the bottom of the preparation chamber below the at least one rack and the collection pan; and
    a programmable controller operatively connected to the heat source, the steam source and the smoke generator, the controller being programmable to operate any one of the heat source, the steam source and the smoke generator in any predetermined sequence, and for any predetermined duration of time.

15. The multifunctional food preparation apparatus of claim 14 wherein said steam source cover is removable.

16. The multifunctional food preparation apparatus of claim 14 wherein the controller is operatively connected to the main heat source, the steam source heating element and the smoke generator heating element.

17. The multifunctional food preparation apparatus of claim 14 wherein the airflow path defined by the first rack mounting structure and the airflow path defined by the second rack mounting structure each has at least one vent formed therein adjacent the collection pan.

* * * * *